G. A. HOLMES.
SNAP FASTENER MEMBER.
APPLICATION FILED SEPT. 9, 1908.

926,871.

Patented July 6, 1909.

WITNESSES:

INVENTOR:

UNITED STATES PATENT OFFICE.

GEORGE A. HOLMES, OF NEWTON CENTER, MASSACHUSETTS, ASSIGNOR TO UNITED STATES FASTENER COMPANY, OF BOSTON, MASSACHUSETTS, A CORPORATION OF MAINE.

SNAP-FASTENER MEMBER.

No. 926,871.     Specification of Letters Patent.     Patented July 6, 1909.

Application filed September 9, 1908. Serial No. 452,191.

*To all whom it may concern:*

Be it known that I, GEORGE A. HOLMES, a citizen of the United States, and resident of Newton Center, in the county of Middlesex and State of Massachusetts, have invented new and useful Improvements in Snap-Fastener Members, of which the following is a specification.

My invention relates to snap fasteners and particularly to self-piercing stud members therefor.

One object of the invention is to provide a strong and durable fastener member of the class described, the parts of which may be quickly and easily assembled.

A further object of my invention is to provide a self-piercing fastener member which may be quickly and easily attached to material and which will not cause the objectionable puckering commonly resulting from securing fastener members to material without previous perforation of the latter.

A further object of my invention is to provide a stud member which is for all practical purposes non-crushable, but still possesses all the resiliency of the ordinary "bird-cage" spring.

Figure 1:
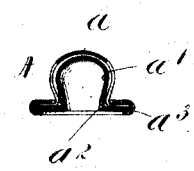
Figure 2:
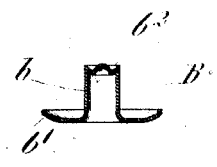
Figure 3:
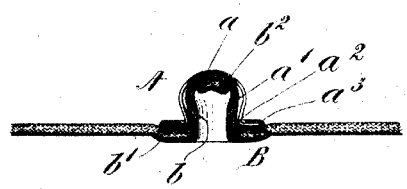

Referring to the drawings illustrating an embodiment of my invention,—Figures 1 and 2 are respectively sectional views of the upper and lower portions of a stud member; and Fig. 3 shows my improved fastener member in section secured to material.

A represents the upper section of a stud for use as a member of a snap fastening pair, comprising a resilient outer member $a$, commonly called a "bird-cage" spring, and a female member or anvil piece $a'$ within the spring $a$, having an opening $a^2$. This anvil piece $a'$ is held within the spring $a$ by a collet $a^3$. B is the lower section of the stud member adapted to be seated on the opposite side of material, and comprising a male member or post $b$ having a flange $b'$ and an upwardly extending annular blade or shearing piece $b^2$.

In applying my improved fastener member, the material without previous perforation, is placed between the parts A and B, and pressure is then applied by suitable instruments. The material is forced by the post $b$ against the edge of the opening $a^2$ and the sharp annular blade or shearing piece $b^2$ cuts quickly and easily through the material, so that the post $b$ passes through the material into the anvil piece $a'$ and is upset therein, thus tightly securing the parts A and B together, with the material between them, as shown in Fig. 3.

One of the great desiderata in fasteners of this class is to perform the shearing operation in the plane of the material; for it is obvious that if the material is carried ever so slightly into the opening $a^2$, puckering will inevitably result and the fabric will not have that smooth appearance about the fastener which is highly desirable, if not indeed absolutely essential, in a successful commercial fastener.

In my improved fastener member the post $b$ does not carry the material surrounding the post upward into the anvil piece $a'$. The pressure of the post $b$ against the material causes a comparatively tight stretching of the latter across the edge of the opening $a^2$ and continued pressure instead of pushing the material upward into the anvil piece, causes the sharp annular blade $b^2$ to cut through the material carrying with it only the part of the material cut out by the shearing piece or blade. The post $b$ then passes into the anvil piece $a$ where it is upset. In this manner the shearing operation is performed in the plane of the material and the latter presents a perfectly smooth appearance when the fastener member is attached. It will be seen furthermore that when the parts are assembled as shown in Fig. 3, the outer or "bird-cage" spring member $a$ is supported at its top by the top of the inner or anvil piece $a'$, and that the top of the anvil piece $a'$ is supported by the end of post $b$, thus rendering the stud to all intents and purposes rigid and non-crushable, against any pressure or blow exerted on the top of the stud. By this construction I obtain all the rigidity and strength of a solid stud, at the same time preserving the resiliency of the "bird-cage" spring which will yield in the usual way to engage the cap, the top of the spring member $a$ lifting or springing away from the anvil member $a'$ when the sides of the spring member $a$ are compressed by the cap, and thereafter returning to its normal position in contact or nearly so with the anvil member $a'$.

What I claim is:

1. A snap fastener member comprising a male member having a shearing edge at its top and a female member disposed on the opposite side of material and having a shearing edge substantially flush with its lower face, said male member coöperating with said female member to shear the material and adapted to pass through said material into said female member and be upset therein.

2. A stud for a snap fastener comprising two parts, one part provided with a flanged post having an upwardly extending annular blade at its top, the other part disposed on the opposite side of material and having a flanged anvil piece provided with an opening, the edge of said opening substantially flush with said flange, said annular blade coöperating with said edge of said opening to shear the material and said post passing through said material into said anvil piece and being upset therein.

Signed by me at Boston, Massachusetts, this third day of September 1908.

GEORGE A. HOLMES.

Witnesses:
CHARLES D. WOODBERRY,
JOSEPHINE H. RYAN.